United States Patent
Friedrichsen et al.

(10) Patent No.: US 9,416,795 B2
(45) Date of Patent: Aug. 16, 2016

(54) REVERSE OSMOSIS SYSTEM

(75) Inventors: Welm Friedrichsen, Nordborg (DK); Palle Olsen, Nordborg (DK); Erik Haugaard, Graasten (DK)

(73) Assignee: Danfoss A/S, Nordborg (DK)

( * ) Notice: Subject to any disclaimer, the term of this patent is extended or adjusted under 35 U.S.C. 154(b) by 944 days.

(21) Appl. No.: 13/060,736

(22) PCT Filed: Aug. 28, 2009

(86) PCT No.: PCT/DK2009/000192
§ 371 (c)(1),
(2), (4) Date: Apr. 25, 2011

(87) PCT Pub. No.: WO2010/022726
PCT Pub. Date: Mar. 4, 2010

(65) Prior Publication Data
US 2011/0203987 A1    Aug. 25, 2011

(30) Foreign Application Priority Data
Aug. 29, 2008 (DE) .......... 10 2008 044 869

(51) Int. Cl.
| | |
|---|---|
| B01D 61/02 | (2006.01) |
| F04F 13/00 | (2009.01) |
| B01D 61/06 | (2006.01) |
| B01D 61/10 | (2006.01) |
| B01D 61/12 | (2006.01) |

(52) U.S. Cl.
CPC .............. *F04F 13/00* (2013.01); *B01D 61/025* (2013.01); *B01D 61/06* (2013.01); *B01D 61/10* (2013.01); *B01D 61/12* (2013.01); *B01D 2311/246* (2013.01); *B01D 2313/243* (2013.01); *B01D 2313/246* (2013.01)

(58) Field of Classification Search
USPC ...................................... 210/321.66
See application file for complete search history.

(56) References Cited

U.S. PATENT DOCUMENTS

| | | | | |
|---|---|---|---|---|
| 4,842,725 A | * | 6/1989 | Blad et al. ............ | 210/137 |
| 4,887,942 A | | 12/1989 | Hauge | |
| 4,973,408 A | | 11/1990 | Keefer | |
| 5,190,447 A | * | 3/1993 | Schneider ............ | 417/356 |
| 5,306,428 A | | 4/1994 | Tonner | |
| 5,320,755 A | | 6/1994 | Hagqvist et al. | |

(Continued)

FOREIGN PATENT DOCUMENTS

| | | |
|---|---|---|
| DE | 2533151 A1 | 2/1976 |
| DE | 3781148 T2 | 3/1993 |

(Continued)

OTHER PUBLICATIONS

International search report for PCT/DK2009/000192 dated Oct. 5, 2009.

*Primary Examiner* — Terry Cecil
(74) *Attorney, Agent, or Firm* — McCormick, Paulding & Huber LLP

(57) ABSTRACT

The invention concerns a reverse osmosis system (1) with a membrane unit (2) comprising an inlet (3), a permeate outlet (4) and a concentrate outlet (5), a high-pressure pump (8) that is connected to the inlet (3), a pressure exchanger (11) connected on its concentrate side (10) to the concentrate outlet (5), and a booster pump between the pressure exchanger (11) and the inlet (3). It is endeavored to make the energy consumption as small as possible. For this purpose, the booster pump is made as a displacement pump.

14 Claims, 3 Drawing Sheets

(56) References Cited

U.S. PATENT DOCUMENTS

| | | |
|---|---|---|
| 5,338,158 A | 8/1994 | Hauge |
| 5,482,441 A * | 1/1996 | Permar .................. 417/216 |
| 5,647,973 A * | 7/1997 | Desaulniers ........... B01D 61/12 210/195.2 |
| 5,988,993 A | 11/1999 | Hauge |
| 6,190,556 B1 | 2/2001 | Uhlinger |
| 6,468,431 B1 | 10/2002 | Oklelas, Jr. |
| 6,540,487 B2 | 4/2003 | Polizos et al. |
| 6,713,028 B1 | 3/2004 | Oklejas, Jr. |
| 6,797,173 B1 | 9/2004 | Oklejas, Jr. |
| 7,168,927 B2 | 1/2007 | Brueckmann et al. |
| 7,188,562 B2 | 3/2007 | Hansen et al. |
| 7,214,315 B2 | 5/2007 | Shumway |
| 7,731,847 B2 * | 6/2010 | Ton That ................. 210/257.2 |
| 7,871,522 B2 * | 1/2011 | Stover et al. .............. 210/652 |
| 8,128,821 B2 * | 3/2012 | Oklejas, Jr. ............ 210/321.66 |
| 2003/0221549 A1 | 12/2003 | Hansen et al. |
| 2004/0089605 A1 | 5/2004 | Brandt et al. |
| 2004/0164022 A1 * | 8/2004 | Solomon ..................... 210/637 |
| 2006/0037895 A1 * | 2/2006 | Shumway .............. B01D 61/06 210/137 |
| 2006/0037907 A1 | 2/2006 | Shumway |
| 2007/0137170 A1 | 6/2007 | Bross et al. |
| 2008/0223207 A1 | 9/2008 | Olsen et al. |

FOREIGN PATENT DOCUMENTS

| | | |
|---|---|---|
| DE | 10223844 A1 | 12/2003 |
| DE | 102004038440 A1 | 3/2006 |
| DE | 102006057364 A1 | 6/2008 |
| EP | 1256371 A1 | 11/2002 |
| EP | 1547670 A1 | 6/2005 |
| WO | 9917028 A1 | 4/1999 |
| WO | 2006015682 A1 | 2/2006 |
| WO | 2007090406 A1 | 8/2007 |
| WO | 2007096679 A1 | 8/2007 |

* cited by examiner

REVERSE OSMOSIS SYSTEM

CROSS REFERENCE TO RELATED APPLICATIONS

This application is entitled to the benefit of and incorporates by reference International Patent Application No. PCT/DK2009/000192 filed on Aug. 28, 2009 and German Patent Application No. 10 2008 044 869.9 filed on Aug. 29, 2008.

FIELD OF THE INVENTION

The invention concerns a reverse osmosis system with a membrane unit comprising an inlet, a permeate outlet and a concentrate outlet, a high-pressure pump that is connected to the inlet, a pressure exchanger connected on its concentrate side to the concentrate outlet, and a booster pump between the pressure exchanger and the inlet.

BACKGROUND OF THE INVENTION

A reverse osmosis system, for example, serves the purpose of gaining drinking water from salt water or waste water, in the following called "feed water". For this purpose, the high-pressure pump brings the feed water to a relatively high pressure, for example 80 bar or more, after which the feed water is supplied to the membrane unit. The membrane unit comprises a semi permeable membrane retaining the impurities or the salt of the feed water, only letting the cleaned water, called permeate, pass. The salt and dirt concentration in the remaining feed water then increases. The feed water with the increased concentration, also called concentrate, is discharged from the membrane unit through the concentrate outlet. However, this concentrate is still at a relatively high pressure of, for example, 60 to 70 bar, so that there is a wish to regain the energy content of the concentrate. However, the invention is not limited to the use of water as fluid.

It is therefore known to connect the concentrate outlet to a pressure exchanger. On its concentrate side, the pressure exchanger is supplied with the concentrate with the increased pressure. On the other side, the supply side, the feed water is supplied, whose pressure is increased by the concentrate. Pressure exchangers are, for example, described in DE 37 81 148 T2, U.S. Pat. No. 5,338,158, U.S. Pat. No. 5,988,993, WO 99/17028 A1, U.S. Pat. No. 6,540,487 B2 or U.S. Pat. No. 7,214,315 B2. The latter document also mentions the use in a reverse osmosis process.

The pressure exchanger or pressure converter can, however, usually not transfer the whole pressure of the concentrate to the feed water. Also, usually the membrane unit has a certain pressure loss between the inlet and the concentrate outlet. In order to bring the share of the feed water that has been brought to a higher pressure by means of the pressure exchanger up to the pressure required by the membrane unit, a booster pump is therefore required. This booster pump has to be driven, meaning that additional energy is required. The control of it is problematic. If the booster pump transports too much fluid, it may happen that it does not only transport feed water but also concentrate, so that the concentrate concentration on the inlet side of the membrane increases, which again causes a reduced efficiency. This phenomenon is called "mixing". An increased salt content increases the energy consumption. Many systems therefore use one or more flow meters to prevent a mixing of the fluids.

SUMMARY OF THE INVENTION

The invention is based on the task of keeping the energy consumption as low as possible.

With a reverse osmosis system as mentioned in the introduction, this task is solved in that the booster pump is made as a displacement pump.

A displacement pump is a pump with a positive displacement, in which the fluid is transported through closed volumes. In other words a displacement pump has a constant feed performance for each work cycle. A work cycle can, for example be a rotation or a piston stroke or the like. Examples of displacement pumps are, piston, gear wheel, gerotor, orbit, membrane, hose, peristaltic, screw, spindle, eccentric screw or vane pumps, this list not being complete. A displacement pump has a known efficiency and a sufficiently linear characteristic between the speed and the pump output, that is, the supplied volume. Contrary to this, pumps that do not work with closed volumes have no linear dependence between the speed and the pump output. For example, centrifugal pumps, jet and turbine pumps belong to this category, but also this list is not complete. Compared with a centrifugal pump, the energy consumption of a displacement pump is small. Thus, an energy saving can be achieved in relation to the centrifugal pumps used in reverse osmosis systems until now. For a large flow, a centrifugal pump requires a much higher speed than a displacement pump. If the pressure exchanger is mounted on the same shaft, it has to run with the same high speed. This may cause that the time available for a pressure exchange is too short. A further advantage is that with a displacement pump the flow the pressure exchanger can be controlled in a substantially more accurate manner that until now. This flow is substantially a linear function of the speed of the displacement pump. Accordingly, it can easily be achieved that by means of the pressure exchanger as much feed water as possible can be acted upon by the pressure of the concentrate. On the other hand, however, it can be avoided that concentrate is transported through the pressure exchanger and then back into the inlet of the membrane unit. Accordingly, a mixing of feed water and concentrate can practically be avoided, which has a positive influence on the efficiency.

Preferably, a measuring motor is arranged between the concentrate outlet and the pressure exchanger. Instead of a flow transmitter the measuring motor measures the flow from the concentrate outlet to the pressure exchanger. At the same time, the energy contained in the concentrate can, for example, be used to drive the pressure exchanger. The speed of the measuring motor then makes the information about the flow of concentrate available, which can, for example, be used to control the pressure exchanger or the displacement pump. If the measuring motor is arranged here, it interacts with the displacement pump on the other side of the pressure exchanger. However, the measuring motor can also be arranged at one of the two other connections of the pressure exchanger.

Preferably, the pressure exchanger and the displacement pump have mutually adapted throughput volumes. Accordingly, during a predetermined period, the displacement pump supplies exactly the amount of feed water, which the pressure exchanger can bring to increased pressure during the same period. It may, for example, be provided that the pressure exchanger and the displacement pump have a common control, with which, for example, the speeds of the displacement pump and the pressure exchanger are controlled in dependence of one another.

In an alternative embodiment, it may be provided that the displacement pump is made as a variable displacement pump. A variable displacement pump has a variable supply volume per rotation or work cycle. This, if initially the displacement pump does not have a supply volume that is adapted to the volume of the pressure exchanger, this adaptation can still be made during operation.

It is particularly preferred that a concentrate sensor is connected in series after the displacement pump, said concentrate sensor being connected to an adjustment device of the displacement pump. The concentrate sensor determines if too much concentrate enters the feed water. If this is the case, the supply volume of the displacement pump is decreased accordingly to avoid the mixing of concentrate and feed water. The adjustment device can work in different ways, for example, mechanically, hydraulically or electrically.

Preferably, the pressure exchanger and the displacement pump have a common drive shaft. This is a simple way of adapting the speed of the displacement pump to the speed of the pressure exchanger. With a corresponding adaptation of the throughput volumes it may be ensured that en optimum operation point is achieved. In this operation point the maximum possible amount of feed water is acted upon by the pressure of the concentrate without causing concentrate to get into the feed water. Further, the common drive shaft provides manufacturing advantages. Only one single drive is required for the pressure exchanger and the displacement pump. The pressure exchanger can also be driven at low speeds, as a displacement pump also supplies according to specifications at low speeds.

It is also advantageous that the displacement pump and the pressure exchanger have a common shaft sealing area. Both the displacement pump and the pressure exchanger have at least one area acted upon by fluid with an increased pressure. Now, the shaft sealing area, which is acted upon by high pressure, can be arranged between the displacement pump and the pressure exchanger, so that only one opening to the outside is required for the drive shaft. In the common shaft sealing area the requirements for the tightness are smaller.

It is also advantageous that the displacement pump has a pump inlet at a front side, with which it is arranged at the pressure exchanger. In a manner of speaking, this results in a housing in which a channel for high-pressure water is already provided. Thus, an additional piping is saved. This reduces pressure losses, which has a positive influence on the efficiency.

Preferably, the pump inlet is placed opposite an inlet of the pressure exchanger. Thus, in a manner of speaking, the pump inlet and the inlet of the pressure exchanger on the concentrate side are then arranged in relation to each other on a straight line or somewhat offset to one another in the rotation direction. This causes that the concentrate with increased pressure can transport the feed water from the rotor of the pressure exchanger into the displacement pump with the smallest possible pressure losses. Also this causes a good efficiency.

In a further preferred embodiment it is provided that the high-pressure pump has a common drive shaft with the displacement pump. Thus, the high-pressure pump and the displacement pump can be driven by the same motor. All drives can, for example, be made as electric motors supplied by a frequency converter, so that also here the speeds of the motor(s) can be controlled. The use of a common drive shaft for high-pressure pump and displacement pump has the advantage that the control of the reverse osmosis system is simplified. In the first line, the high-pressure pump is responsible for making the required fluid amount available to the membrane unit. Among other things, the required fluid amount depends on the amount of fluid removed from the permeate outlet. Also the concentrate amount depends on the permeate amount. If more permeate is removed, more fluid is put through and more concentrate occurs automatically. Thus, a substantially linear dependence between the output of the high-pressure pump and the concentrate amount appears. As the concentrate should transfer its pressure substantially completely to the feed water, also a corresponding amount of feed water must be transported. Thus, the dependence between the transport of the feed water through the displacement pump and the transport of feed water through the high-pressure pump is also to a sufficient degree linear. Accordingly, a common drive shaft can be used without problems, which however requires that a displacement pump is used as booster pump.

Preferably, the high-pressure pump, the pressure exchanger and the displacement pump are combined to one component. This firstly has the effect that the high-pressure pump, the pressure exchanger and the displacement pump have a common drive shaft and are driven by a common motor. This motor can be a speed-controlled electric motor to adapt the output to the permeate need. Further, this embodiment has the advantage that a smaller number of sealings towards the outside is required. For example, one shaft sealing will be sufficient, when the shaft is only led out of the component at one front side. Further, the required channels can be arranged in the component, so that an external piping or pipe connection can be saved, but also the energy consumption sinks, as pressure losses are reduced.

It is preferred that the displacement pump is arranged between the pressure exchanger and the high-pressure pump. This gives a favourable channeling of the individual fluids, that is, for the concentrate and for the feed water. This favourable channeling contributes to keeping the pressure losses small, thus making the efficiency as large as possible.

Preferably, the displacement pump and the high-pressure pump have a common outlet from the component. This simplifies the pipe connection between the component and the membrane unit. In fact, only one single pipe is required between the inlet of the membrane unit and the component. As this also keeps pressure losses small, this measure contributes to a good efficiency.

Preferably, the concentrate side of the pressure exchanger has a concentrate influencing arrangement that comprises at least one of the following elements: a bypass valve, a pressure relief valve and a throttle valve. The bypass valve, for example, enables pressure relief of the concentrate outlet of the membrane unit. The pressure relief valve prevents that the pressure exchanger is acted upon by an impermissibly high pressure at the concentrate side, and the throttle valve can be used to prevent the risk of cavitation. Further, this throttle valve contributes to influencing the flow of low-pressure feed water to the low-pressure concentrate. One, two or three of these elements can be used according to wish.

It is also preferred that a safety valve is arranged in parallel to the displacement pump. This safety valve prevents the pressure difference over the displacement pump from becoming too large.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENTS

Figure 1:
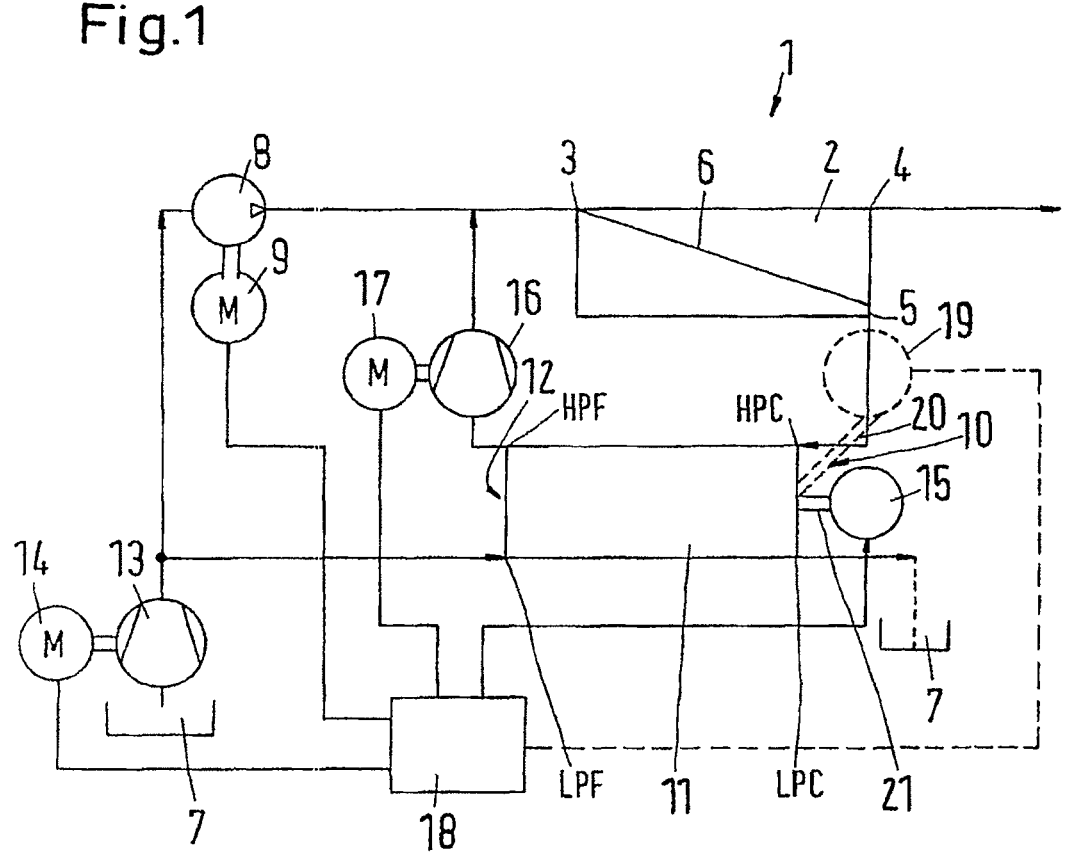
FIG. 1 is a first embodiment of a reverse osmosis system.

FIG. 1 is a schematic view of a reverse osmosis system 1, which can also be called a reverse osmosis plant or a reverse osmosis arrangement.

The reverse osmosis system comprises a membrane unit 2 with an inlet 3, a permeate outlet 4 and a concentrate outlet 5. A membrane 6 is arranged between the inlet 3 and the permeate outlet 4.

By means of a high-pressure pump 8, which is driven by a motor 9, the membrane unit 2 is supplied with feed water from a reservoir 7, for example, the sea. The high-pressure pump 8 can, for example, be a piston pump. The motor 9 can be an electric motor, which is controlled by a frequency converter. Thus, it is possible to drive the high-pressure pump 8 with variable speeds and thus variable outputs.

For reasons of simplicity, the water from the reservoir 7 will in the following be called "feed water".

The concentrate outlet 5 is connected to a concentrate side 10 of a pressure exchanger 11, or rather, to a high-pressure concentrate connection HPC. The concentrate side 10 also comprises a low-pressure concentrate connection LPC, which is again connected to the reservoir 7.

The pressure exchanger 11 also has a feed water side 12, which comprises a low-pressure feed water connection LPF and a high-pressure feed water connection HPF. The low-pressure feed water connection LPF is connected to a feed pump 13, which also supplies the high-pressure pump 8 with feed water. The feed pump 13 is also driven by a motor 14. It is also possible to use different pumps to supply the high-pressure pump 8 and the pressure exchanger 11.

The pressure exchanger 11 is driven by a motor 15, which here makes a rotor of the pressure exchanger 11 rotate. In a manner known per se, a channel of the rotor is filled with feed water through the low-pressure feed water connection LPF. The feed water pushes concentrate contained in the channel out through the low-pressure concentrate connection LPC, said concentrate flowing back into the reservoir 7. When the rotor has been turned be a specific angle, for example approximately 180°, the concentrate at the high-pressure concentration connection HPC pushes the feed water out through the high-pressure feed water connection HPF, so that the feed water at the high-pressure feed water connection HPF has already been brought to an increased pressure.

However, this pressure does not correspond to the pressure at the outlet of the high-pressure pump 8, as between the inlet 3 and the concentrate outlet 5 the membrane unit 2 experiences a certain pressure loss, and also the pressure exchanger 11 causes a certain pressure loss. Accordingly, a booster pump in the form of a displacement pump 16 is arranged after the pressure exchanger 11. The displacement pump 16 is driven by a motor 17.

Independently of the speed, each rotation of the displacement pump supplies a constant volume. This results in a substantially linear correlation between the speed and the output. The displacement pump 16 can be a piston pump, a gear wheel pump, a gerotor pump, an orbit pump, a membrane pump, a hose pump, a peristaltic pump, a screw pump, a spindle pump, an eccenter screw pump, a vane pump or the like. Such a displacement pump 16 has a better efficiency than, for example, a centrifugal pump, a jet pump or a turbine pump.

The motors 9, 14, 15 and 17 can be controlled by a control device 18. The control device 18 "knows" the throughput provided by the pressure exchanger 11. Accordingly, the control device 18 can also control the motor 17 of the displacement pump 16 so that the output of the displacement pump 16 is relatively accurately adapted to the throughput of the pressure exchanger 11. A major advantage of the displacement pump 16 is that, as mentioned, it has a linear dependence between the speed and the output, so that the output can be set accurately by changing the speed. Thus, it is prevented that concentrate from the concentrate connection 5 is mixed with feed water from the feed pump 13. In many cases, it is also possible to set the pressure independently of the load.

If further information is required, for example information about the pressure at the concentrate outlet 5, a corresponding pressure sensor can be arranged here, which is then also connected to the control device 18. For reasons of clarity, however, this is not shown.

Optionally, a measuring motor 19 can be arranged in the pipe between the concentrate outlet 5 and the high-pressure concentrate connection HPF of the pressure exchanger 11, said measuring motor 19 also being connected to the control device 18. Via a drive shaft 20, the measuring motor 19 can be connected to the pressure exchanger 11, so that measuring motor 19 does not only provide information about the amount of concentrate leaving through the concentrate outlet 5 of the membrane unit 2, but also drives the pressure exchanger 11. Driving via the measuring motor 19 will usually not be sufficient, so that the motor 15 still drives the pressure exchanger 11 via a further drive shaft 21. Here the drive shafts 20, 21 are shown as separate items. However, they can also be made as one component.

The measuring motor 19 is also made as a motor with constant displacement, so that independently of the speed the measuring motor 19 has a constant throughput per rotation.

The displacement pump 16 can also be made as a variable displacement pump, that is, the volume displaced per rotation can be set to a desired value.

Figure 2:
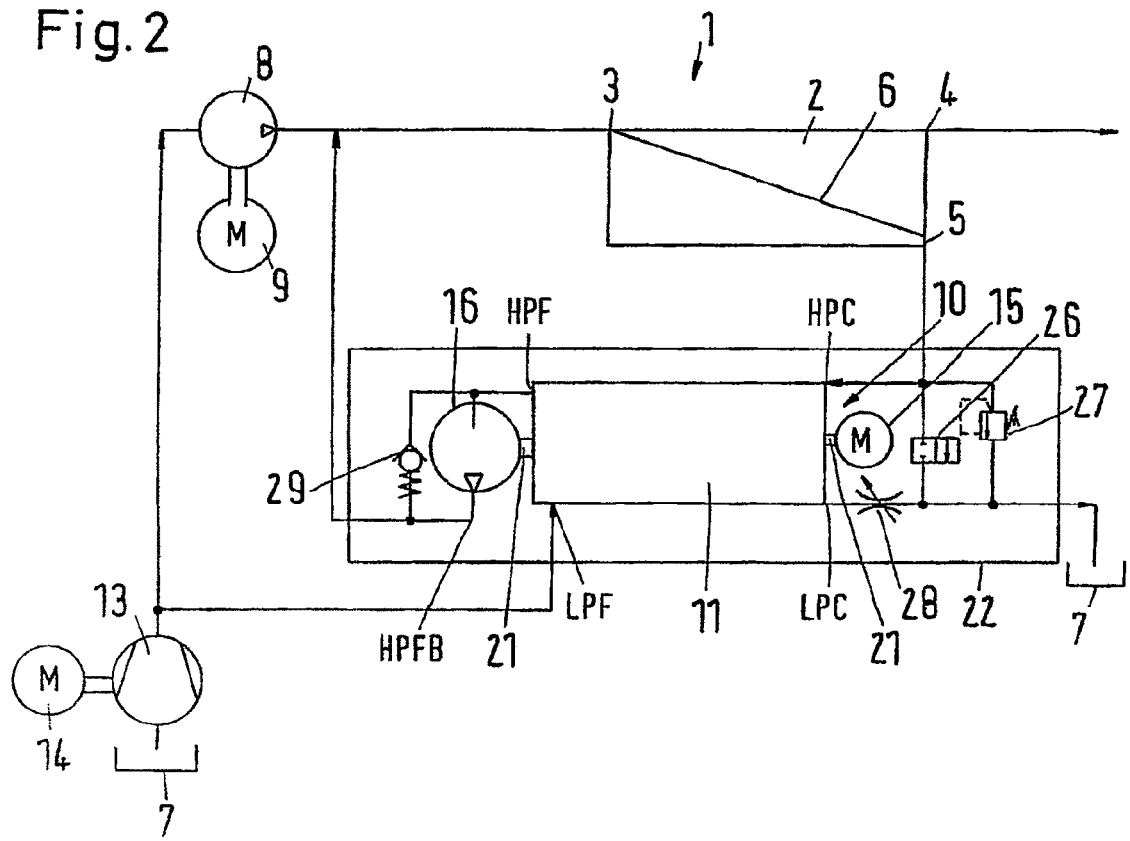
FIG. 2 is a second embodiment of a reverse osmosis system.

FIG. 2 shows a modified embodiment, in which the same elements have the same reference numbers as in FIG. 1. For reasons of clarity, the control device 18 and its connections are not shown in detail.

In this embodiment, the pressure exchanger 11 and the displacement pump 16 are combined to one component 22. This component is shown schematically in FIG. 3.

Via a common drive shaft 21, the motor 15 is connected to both the pressure exchanger 11 and the displacement pump 16. In this connection, the displacement pump 16 and the pressure exchanger 11 are assembled by their front sides, for example by means of front side flanges, bolts not shown in detail ensuring that the displacement pump 16 and the pressure exchanger 11 form a common unit.

This assembly to one unit 22 can now ensure that, in a manner of speaking, the high-pressure concentration connection HPC and the high-pressure feed water connection HPF are arranged on a straight line and are in alignment with the inlet 23 of the displacement pump 16. The displacement pump 16, in this case, for example, a gerotor pump, can then supply pressure boosted feed water at its outlet HPFB. Here, the pressure then corresponds to the pressure at the outlet of the high-pressure pump 8.

The assembly of the displacement pump 16 and the pressure exchanger 11 causes the saving of an external piping, that is, external pipes between the individual parts. On the one side, this saves costs during manufacturing. Further, the energy consumption is reduced, as pressure losses can be reduced.

Further, an advantage occurs in that the drive shaft 21 has a common shaft sealing area 24 at the pressure exchanger 11 and the displacement pump 16. Accordingly, the drive shaft 21 only has to be sealed towards the outside at the pressure exchanger 11. For this purpose, a sealing 25 is provided at the front side of the pressure exchanger 11 facing away from the displacement pump 16. This sealing 25 is loaded by a relatively low pressure.

FIG. 2 shows that the concentrate side 10 of the pressure exchanger 11 is provided with several concentrate influencing arrangements. These include a bypass valve 26, which can generate a short-circuit over the inlet of the pressure exchanger 11 and be opened manually or via a control device, a pressure relief valve 27 that is activated by an overpressure and permits this overpressure to run off to the reservoir 7, and a throttle valve 28, which contributes to keeping the risk of cavitation in the pressure exchanger 11 small and to controlling the fluid flow from the low-pressure feed water connection LPF to the low-pressure concentrate connection LPC.

In parallel to the displacement pump 16 is arranged a safety valve 29, for example in the form of a spring-loaded non-return valve, which prevents the pressure difference over the displacement pump 16 from becoming too large.

The number of valves is not limited to the ones mentioned here. For example, also vent valves are possible for all systems.

Figure 3:
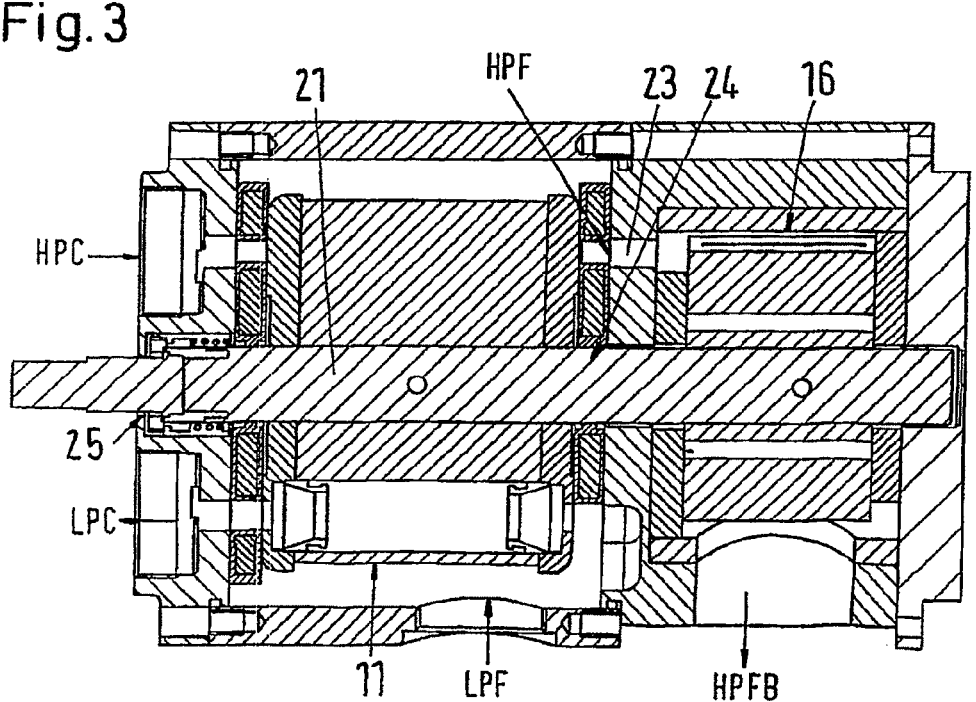
FIG. 3 is a schematic sectional view of a unit with pressure exchanger and displacement pump.
Figure 4:
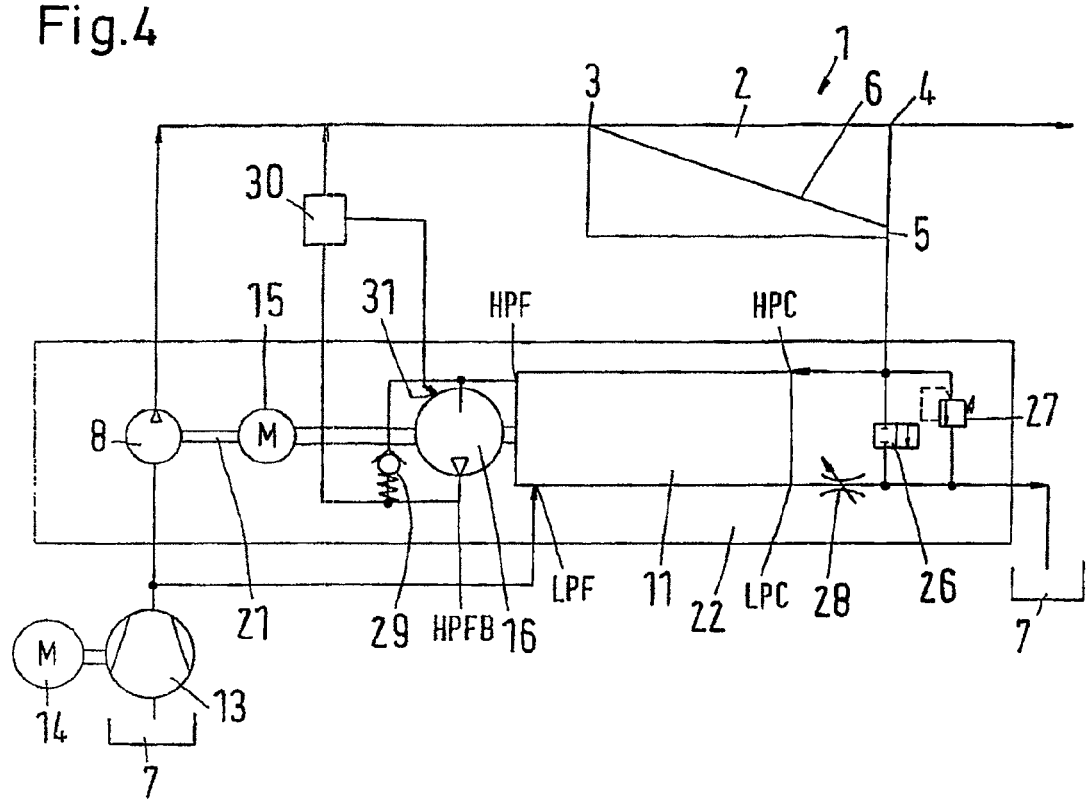
FIG. 4 is a third embodiment of a reverse osmosis system.
Figure 5:
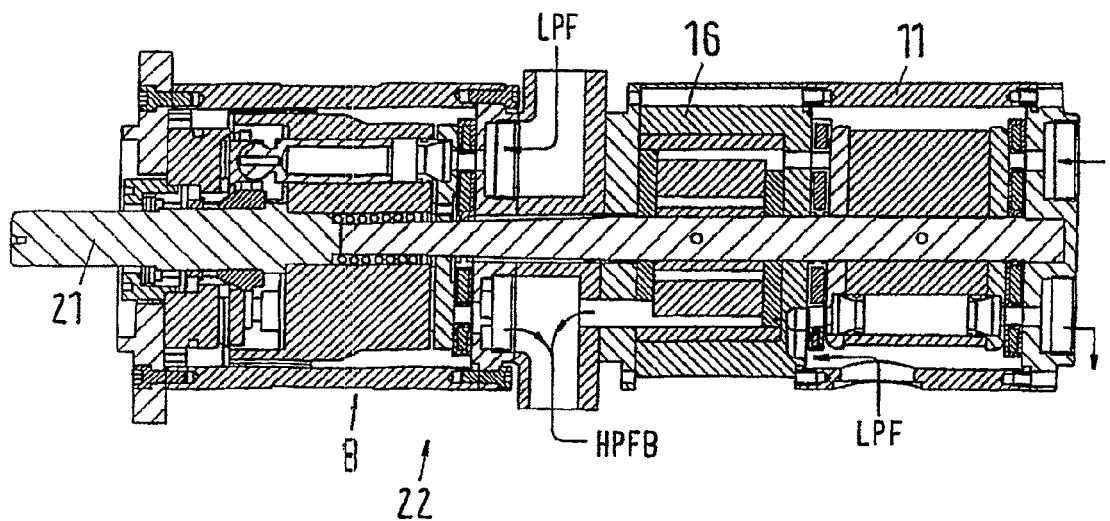
FIG. 5 is a schematic sectional view of a unit with pressure exchanger, displacement pump and high-pressure pump.

The FIGS. 4 and 5 show a further embodiment of a reverse osmosis system 1, in which the same elements have the same reference numbers as in the FIGS. 1 to 3.

In this embodiment, also the high-pressure pump 8 is integrated in the component 22, that is, the displacement pump 16, the pressure exchanger 11 and the high-pressure pump 8 are driven by the same drive shaft 21. FIG. 5 is a schematic view of the realisation of such an arrangement.

Here, the high-pressure pump 8 is an axial piston pump. Next to the high-pressure pump 8 the displacement pump 16 is arranged, so that the high-pressure pump 8 and the displacement pump 16 have a common connection HPFB, at which the feed water is available to the membrane unit 2 with the required high pressure. In this connection, the displacement pump 16 is arranged between the high-pressure pump 8 and the pressure exchanger 11, so that in this case the displacement pump 16 has no openings to the outside requiring sealings. On the one side, a corresponding cover is provided by the pressure exchanger 11, on the other side a cover is provided by the high-pressure pump 8.

In a manner not shown in detail, it may be provided in all embodiments that also in connection with the low-pressure feed water connection LPF or the low-pressure concentrate connection LPC a measuring motor is arranged, which drives the pressure exchanger 11. In this case, the pressure of the feed pump 13 would still have to be increased, so that this pressure could drive the measuring motor, which again could drive the pressure exchanger 11.

FIG. 4 further shows a concentrate sensor 30, which is connected to an adjustment device 31 of the displacement pump 16. In this case, the displacement pump 16 is made with variable displacement. The concentrate sensor 30 currently measures the concentration of the feed water transported by the displacement pump 16. If the sensor detects that concentrate (or too much concentrate) gets into the feed water, the displacement of the displacement pump 16 is correspondingly reduced, so that the output of the displacement pump 16 is adapted to the throughput of the pressure exchanger.

While the present invention has been illustrated and described with respect to a particular embodiment thereof, it should be appreciated by those of ordinary skill in the art that various modifications to this invention may be made without departing from the spirit and scope of the present.

What is claimed is:

1. A reverse osmosis system with a membrane unit comprising an inlet, a permeate outlet and a concentrate outlet, a high-pressure pump that is connected to the inlet, a pressure exchanger connected on its concentrate side to the concentrate outlet, and a booster pump that is a displacement pump having its inlet connected to a high-pressure feed water connection of the pressure exchanger and its outlet connected to the inlet of the membrane unit, the booster pump boosting pressure of, and acting directly upon the feed water exiting the pressure exchanger through the high-pressure feed water connection to correspond to a pressure of feed water exiting the high-pressure pump, wherein the pressure exchanger and the displacement pump have a common drive shaft and mutually adapted throughput volumes.

2. The reverse osmosis system according to claim 1, wherein a measuring motor is arranged between the concentrate outlet and the pressure exchanger.

3. The reverse osmosis system according to claim 1, wherein the displacement pump is made as a variable displacement pump.

4. The reverse osmosis system according to claim 3, wherein a concentrate sensor is connected in series after the displacement pump, said concentrate sensor being connected to an adjustment device of the displacement pump.

5. The reverse osmosis system according to claim 1, wherein the displacement pump and the pressure exchanger have a common shaft sealing area.

6. The reverse osmosis system according to claim 1, wherein the displacement pump has a pump inlet at a front side, with which it is arranged at the pressure exchanger.

7. The reverse osmosis system according to claim 6, wherein the pump inlet is placed opposite an inlet (HPC) of the pressure exchanger.

8. The reverse osmosis system according to claim 1, wherein the high-pressure pump has a common drive shaft with the displacement pump.

9. The reverse osmosis system according to claim 8, wherein the high-pressure pump, the pressure exchanger and the displacement pump are combined into one component.

10. The reverse osmosis system according to claim 9, wherein the displacement pump is arranged between the pressure exchanger and the high-pressure pump.

11. The reverse osmosis system according to claim 10, wherein the displacement pump and the high-pressure pump have a common outlet (HPFB) from the component.

12. The reverse osmosis system according to claim 1, wherein the concentrate side of the pressure exchanger has a concentrate influencing arrangement that comprises at least one of the following elements: a bypass valve, a pressure relief valve and a throttle valve.

13. The reverse osmosis system according to claim 1, wherein a safety valve is arranged in parallel to the displacement pump.

14. A reverse osmosis system with a membrane unit comprising an inlet, a permeate outlet and a concentrate outlet, a high-pressure pump that is connected to the inlet, a pressure exchanger connected on its concentrate side to the concentrate outlet, a booster pump that is a displacement pump having its inlet connected to a high-pressure feed water connection of the pressure exchanger and its outlet connected to the inlet of the membrane unit, the booster pump boosting pressure of, and acting directly upon the feed water exiting the pressure exchanger through the high-pressure feed water connection to correspond to a pressure of feed water exiting the high-pressure pump, and a concentrate sensor connected in series after the displacement pump and before the membrane unit, said concentrate sensor being connected to an adjustment device of the displacement pump, wherein the pressure exchanger and the displacement pump have a common drive shaft and mutually adapted throughput volumes.

* * * * *